(12) United States Patent
Rai (10) Patent No.: US 8,311,903 B2
(45) Date of Patent: Nov. 13, 2012

(54) METHODS AND SYSTEMS FOR EVALUATING THE IMPACT OF MIGRATING TO A DYNAMIC PROCESSING ENVIRONMENT

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 466 days.

(21) Appl. No.: 12/140,725

(22) Filed: Jun. 17, 2008

(65) Prior Publication Data

US 2009/0313063 A1    Dec. 17, 2009

(51) Int. Cl.
G06Q 10/00 (2012.01)
G06G 1/14 (2006.01)
G06Q 20/00 (2012.01)
G07B 17/00 (2006.01)
G07F 19/00 (2006.01)

(52) U.S. Cl. .............. 705/28; 705/22; 705/30
(58) Field of Classification Search .......... 705/22, 705/28, 30
See application file for complete search history.

(56) References Cited

U.S. PATENT DOCUMENTS

| | | | | |
|---|---|---|---|---|
| 5,563,999 A * | 10/1996 | Yaksich et al. | | 715/209 |
| 5,963,919 A * | 10/1999 | Brinkley et al. | | 705/28 |
| 6,405,178 B1 * | 6/2002 | Manchala et al. | | 705/29 |
| 6,415,277 B1 * | 7/2002 | Klatt et al. | | 1/1 |
| 6,535,294 B1 * | 3/2003 | Arledge et al. | | 358/1.15 |
| 6,805,502 B2 * | 10/2004 | Rai et al. | | 400/61 |
| 7,125,179 B1 * | 10/2006 | Rai et al. | | 400/62 |
| 7,139,721 B2 * | 11/2006 | Borders et al. | | 705/7.24 |
| 2001/0044868 A1 * | 11/2001 | Roztocil et al. | | 710/129 |
| 2002/0161464 A1 * | 10/2002 | Weiner | | 700/97 |
| 2002/0188499 A1 * | 12/2002 | Jenkins et al. | | 705/10 |
| 2003/0016388 A1 * | 1/2003 | Christodoulou et al. | | 358/1.15 |
| 2003/0090722 A1 * | 5/2003 | Eller et al. | | 358/1.17 |
| 2003/0139982 A1 * | 7/2003 | Schwartz et al. | | 705/28 |
| 2004/0061891 A1 * | 4/2004 | Philpot | | 358/1.15 |
| 2004/0103048 A1 * | 5/2004 | Vitulli et al. | | 705/28 |
| 2004/0153379 A1 * | 8/2004 | Joyce et al. | | 705/28 |
| 2004/0260513 A1 * | 12/2004 | Fitzpatrick et al. | | 702/182 |
| 2006/0235557 A1 * | 10/2006 | Knight et al. | | 700/103 |
| 2007/0019233 A1 * | 1/2007 | Rai et al. | | 358/1.15 |
| 2009/0043628 A1 * | 2/2009 | Gombert | | 705/8 |

* cited by examiner

Primary Examiner — Ig T An
(74) Attorney, Agent, or Firm — Fox Rothschild LLP (57) ABSTRACT

In an embodiment, a method of evaluating an impact on inventory levels of migrating from a pre-processing environment to a dynamic processing environment may include identifying a plurality of form types to migrate from a pre-processing environment to a dynamic processing environment and identifying an inventory policy. For each identified form type, corresponding job demand information may be received. A computing device may determine a plurality of total inventory requirements for the identified form types based on the identified inventory policy. The computing device may determine a plurality of migrated inventory requirements for the dynamic processing environment based on the identified inventory policy. One or more statistics pertaining to one or more of the job demand information, the total inventory requirements and the migrated inventory requirements may be displayed to a user.

17 Claims, 6 Drawing Sheets

METHODS AND SYSTEMS FOR EVALUATING THE IMPACT OF MIGRATING TO A DYNAMIC PROCESSING ENVIRONMENT

BACKGROUND

A significant number of document production environments currently process incoming print jobs on pre-printed forms. For example, a print shop that processes bank statements from Bank A may generate the statements on forms that include pre-printed information such as the Bank A logo or the like.

Print shops that process jobs for which demand varies can incur high storage expenses because such print shops can store inventory for jobs that are inconsistently received. Because the demand for certain print jobs can fluctuate, a print shop must hold a certain level of inventory in order to process the jobs that are received.

To reduce such storage expenses, many print shops are currently considering transitioning from the use of pre-printed forms to a dynamic processing system which allows the printing of both the conditional content, such as bank statements, credit card statements and the like, as well as the base content, such as logos, addresses and the like simultaneously on a common substrate, such as plain white paper.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method of evaluating an impact on inventory levels of migrating from a pre-processing environment to a dynamic processing environment may include identifying a plurality of form types to migrate from a pre-processing environment to a dynamic processing environment and identifying an inventory policy. For each identified form type, corresponding job demand information may be received. A computing device may determine a plurality of total inventory requirements for the identified form types based on the identified inventory policy, and the total inventory requirements may include a total average inventory level and a total order-up-to level. The computing device may determine a plurality of migrated inventory requirements for the dynamic processing environment based on the identified inventory policy. The migrated inventory requirements may include a migrated average inventory level and a migrated order-up-to level. One or more statistics pertaining to one or more of the job demand information, the total inventory requirements and the migrated inventory requirements may be displayed to a user.

In an embodiment, a system of evaluating an impact on inventory levels of migrating from a pre-processing environment to a dynamic processing environment may include a processor and a processor-readable storage medium in communication with the processor. The processor-readable storage medium may contain one or more programming instructions for identifying a plurality of form types to migrate from a pre-processing environment to a dynamic processing environment, identifying an inventory policy, and for each identified form type, receiving corresponding job demand information. The processor-readable storage medium may also contain one or more programming instructions for determining, by a computing device, a plurality of total inventory requirements for the identified form types based on the identified inventory policy, determining, by the computing device, a plurality of migrated inventory requirements for the dynamic processing environment and displaying one or more statistics pertaining to one or more of the job demand information, the total inventory requirements and the migrated inventory requirements. The total inventory requirements may include a total average inventory level and a total order-up-to level. The migrated inventory requirements may include a migrated average inventory level and a migrated order-up-to level.

BRIEF DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a "job" refers to a logical unit of work that is to be completed for a customer. In a printing environment, a job may include one or more print jobs from one or more clients. A production system may include equipment that processes a plurality of jobs. Although the disclosed embodiments pertain to document production systems, the disclosed methods and systems can be applied to production systems in general.

A "print job" refers to a job processed in a document production system. For example, a print Job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "resource" is a device that performs a processing function on a job. For example, in a print production environment, a resource may include a printer, a copier, a binder, a hole-punch, collator, a sealer or any other equipment used to process print jobs.

A "sprint shop" refers to an entity that includes a plurality of document production resources, such as printers, cutters, collators and the like. A print shop may be a freestanding entity, including one or more print-related devices, or it may be part of a corporation or other entity. Additionally, a print shop may communicate with one or more servers by way of a local area network or a wide area network, such as the Internet, the World Wide Web or the like.

A "pre-processing environment" is a production environment in which one or more pre-processing operations are performed on a portion of a substrate prior to a job being processed on the substrate. A pre-processing environment may process print jobs using pre-printed forms. For example, a pre-processing environment may process bank statements. Certain information, such as the bank's header and logo, may be printed on forms prior to the content of the bank statement being printed on the substrate.

A "dynamic processing environment" is a production environment in which one or more operations are performed on a portion of a substrate only after a Job is received by the production environment. A dynamic processing environment may perform operations equivalent to the pre-processing and processing operations performed by a pre-processing environment but only after a job is received. For example, a dynamic processing environment may process a print job compromising bank statements by printing the bank's header, logo and statement content when the print job is received.

"Migrating" is the process of transitioning from a pre-processing environment to a dynamic processing environment. In terms of a document production system, migrating is the process of transitioning from a pre-processing environment to a dynamic processing environment.

An "inventory position" is the sum of the actual inventory at a storage location, such as a warehouse, and inventory that has been ordered but not yet delivered minus inventory that is backordered.

An "inventory policy" is an analysis of costs, levels, areas of risks and the like associated with a production environment's inventory.

"Job demand information" is the job volume associated with a production environment over a certain period of time. For example, in a print production environment, job demand information may include print job volumes associated with a print shop over a certain time period.

An "order-up-to level" is a base-stock inventory level maintained by a production environment. For example, an order-up-to level may represent a certain number of weeks' worth inventory associated with a print shop.

"Total inventory requirements" are inventory levels that a production environment maintain in order to process the aggregate job demand for the identified form types. For example, with respect to a print production environment, total inventory requirements may include inventory positions that the print production environment must maintain to process the aggregate print demand for the identified form types. Total inventory requirements may include a total order-up-to level, a total average inventory level or the like.

"Migrated job demand information" is the aggregate job volume associated with the form types identified for migration.

A "migrated order-up-to level" is an order-up-to level associated with a dynamic processing environment. For example, a migrated order-up-to level may represent a certain number of weeks worth of inventory associated with a dynamic processing environment.

"Migrated inventory requirements" are inventory positions that a dynamic processing environment must maintain in order to process its job demand. Migrated inventory requirements may include a migrated average inventory level, a migrated order-up-to level, a coefficient of variation or the like.

An "inventory reduction percentage" is the percentage by which an inventory level associated with the identified form types is reduced by migrating the processing of the identified form types from a pre-processing environment to a dynamic processing environment.

A "statistic" is information that may be used in evaluating the impact of migrating from a pre-processing environment to a dynamic processing environment.

Figure 1:
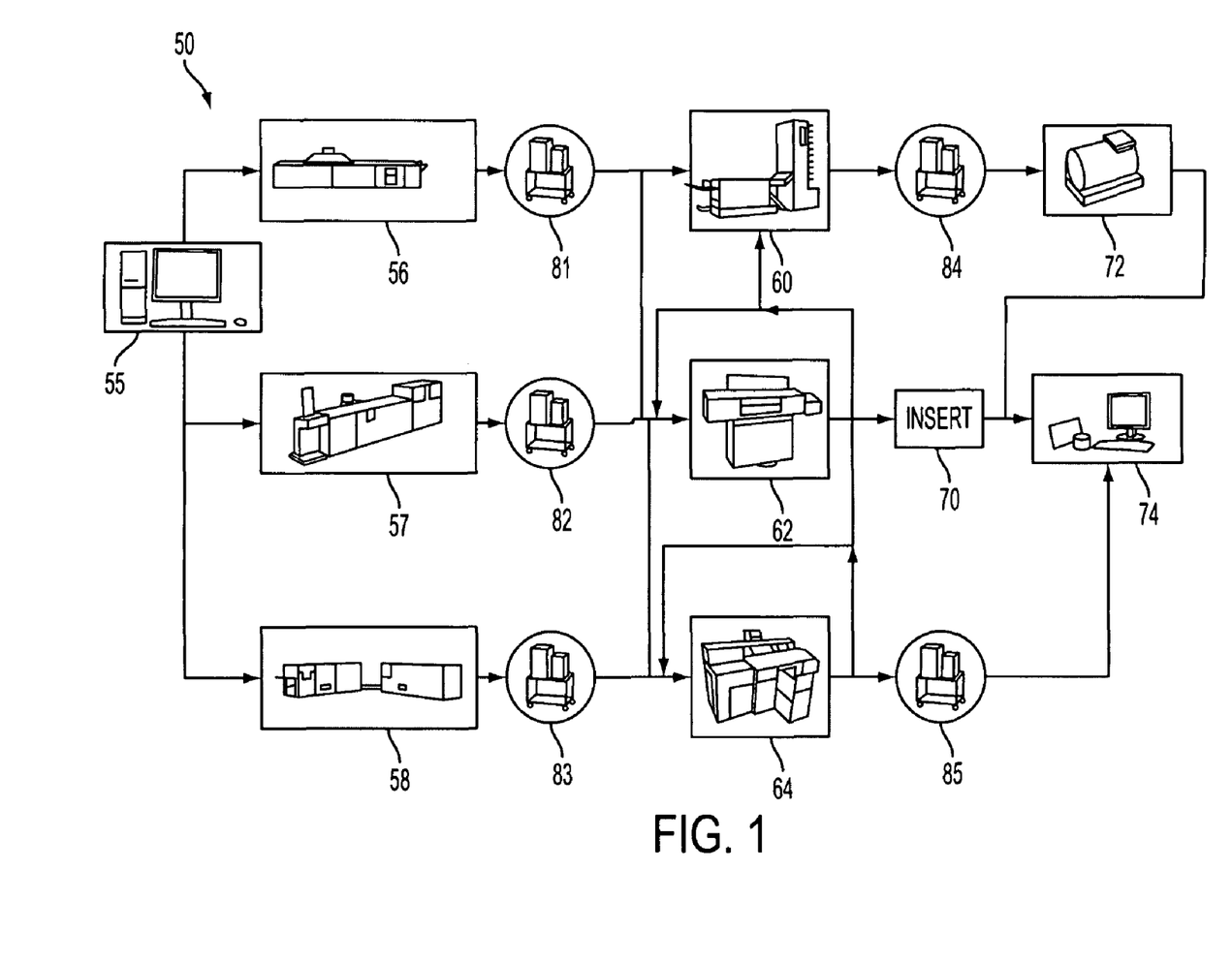
FIG. 1 depicts an exemplary production environment according to an embodiment.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Figure 2:
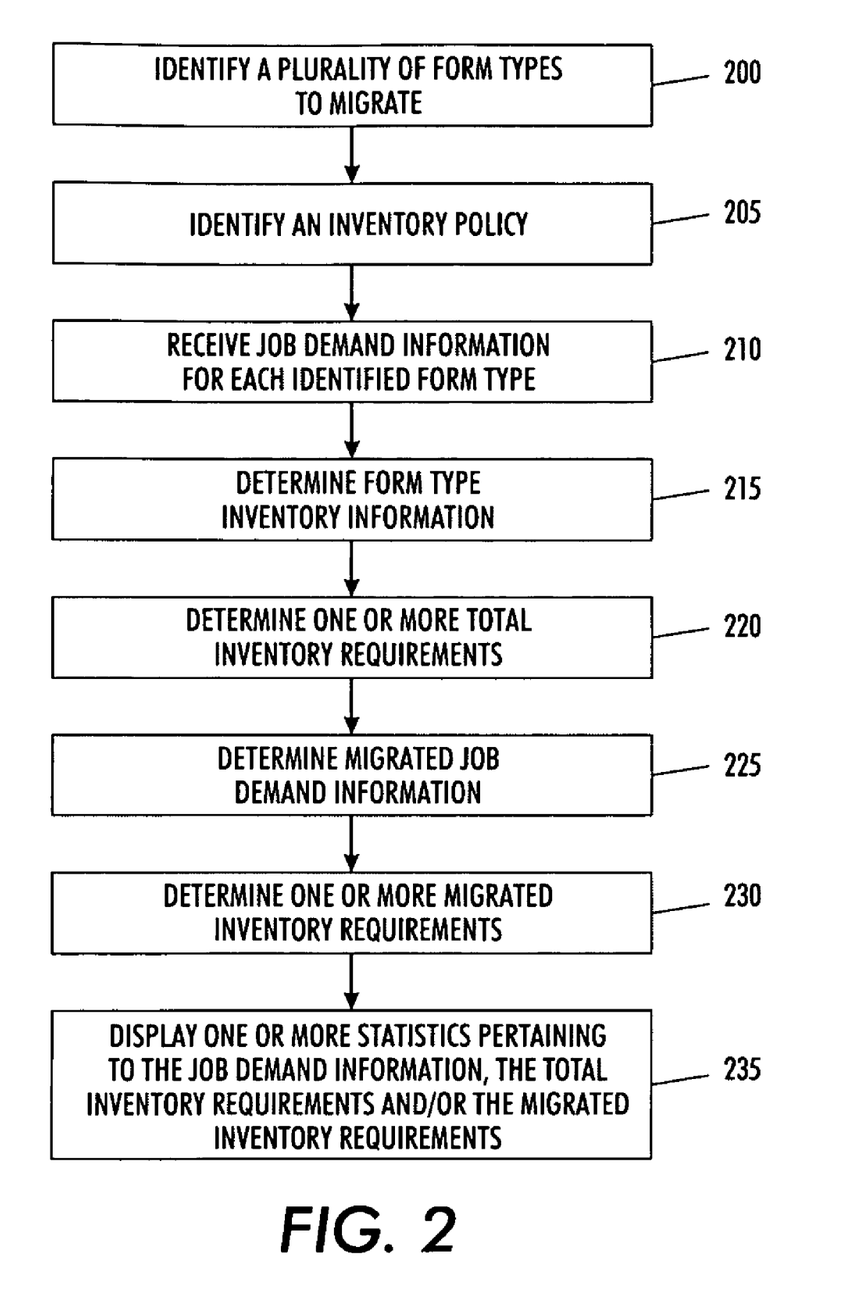
FIG. 2 depicts a flow chart of an exemplary method of evaluating the impact of migrating from a pre-processing environment to a dynamic processing environment according to an embodiment.

FIG. 2 illustrates a flow chart of an exemplary method of evaluating the impact of migrating from a pre-processing environment to a dynamic processing environment according to an embodiment. A pre-processing environment is a production environment in which a portion of one or more jobs is processed on a substrate prior to the jobs being received. For example, a pre-processing environment may process bank statements. Certain information, such as the bank's header and logo, may be printed on forms prior to the pre-processing environment receiving a specific print job.

A dynamic processing environment is a production environment in which an entire job is processed only after the job is received by the production environment. A dynamic processing environment may process bank statements. In contrast to a pre-processing environment, a dynamic processing environment may print the bank's header, logo and statement content only on a substrate only after the print job is received.

To lower costs, such as storage expenses and the like, print shop operators may consider transitioning from a pre-processing environment to a dynamic processing environment. In an embodiment, a user may evaluate the impact of transitioning from a pre-processing environment to a dynamic processing environment by analyzing the demand and variation associated with one or more form types. A form type is a unique pre-printed form on which one or more print jobs may be processed.

A plurality of form types may be identified 200 for migration. In an embodiment, a user may identify 200 the form types to migrate. For example, the user may select a check box, radio button, a drop down box or the like in a graphical user interface to select the form types to migrate. In an alternate embodiment, the forms types may be pre-selected by a user, an administrator or the like. Additional and/or alternate selection methodologies may be used within the scope of this disclosure.

In an embodiment, one or more of the form types processed by the pre-processing environment may be automatically identified 200 for migration. This embodiment may be beneficial to operators of print shops that process numerous different form types.

An inventory policy used to evaluate the impact of migration on inventory positions may be identified 205. An inventory position is the sum of an actual inventory at a storage location, such as a warehouse, and inventory that has been ordered but not yet delivered minus inventory that is backordered. For example, if there are 1,500 pages of paper at a warehouse 1,000 pages awaiting delivery and 500 pages on backorder, the inventory position associated with this print shop is 2,000 pages (i.e., 1,500+1,000−500).

An inventory policy is an analysis of inventory costs, inventory levels, areas of risk and the like associated with a print shop's inventory. An inventory policy may be used to evaluate storage expenses, replenishment time, shortages and other similar factors to determine one or more inventory levels associated with one or more form types. In an embodiment, a user may select an inventory policy used to evaluate the impact of migration on inventory levels using a graphical user interface. For example, a user may select an inventory policy by selecting a check box, a radio button, a drop down box or the like associated with the policy. Additional and/or alternate selection methodologies may be used within the scope of this disclosure. In an alternate embodiment, the inventory policy may be predetermined. Exemplary inventory policies may include, without limitation, a fixed continuous review policy, a variable continuous review policy, a base stock policy and the like.

Figure 3:
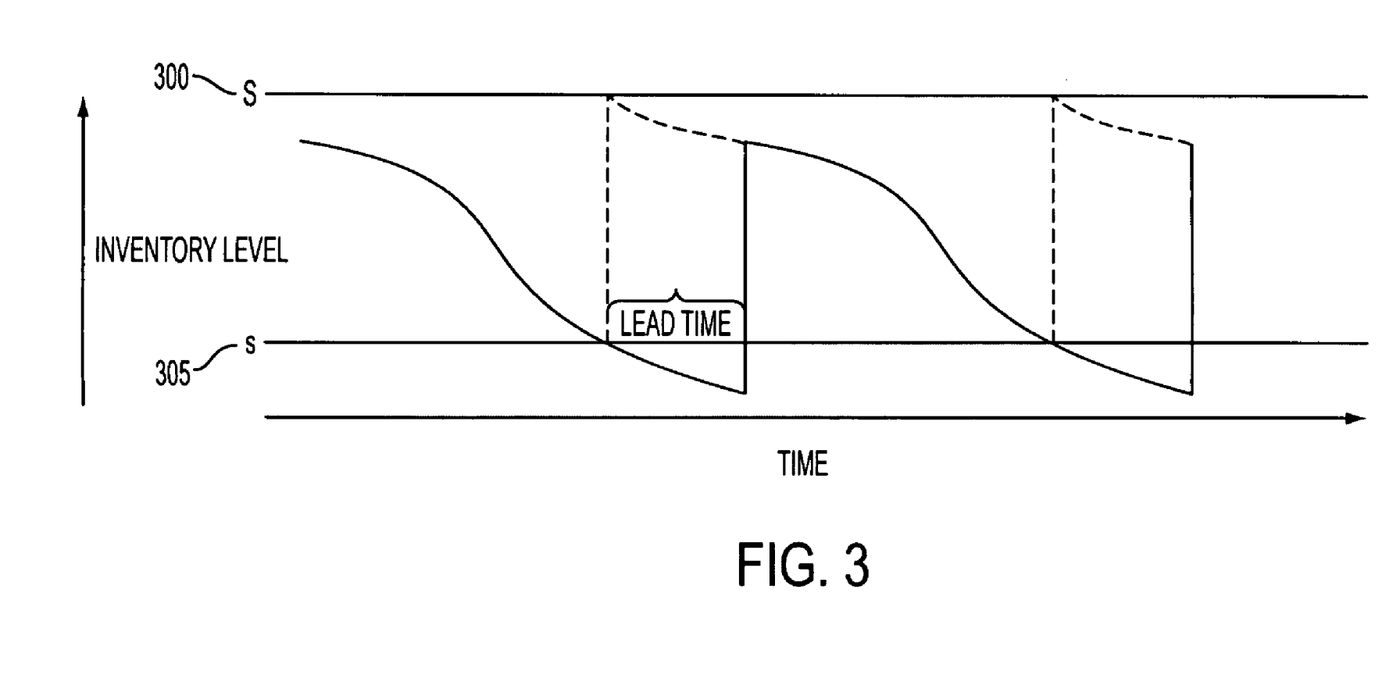
FIG. 3 depicts a graphical representation of an exemplary fixed continuous review inventory policy according to an embodiment.

A fixed continuous review policy continuously monitors the amount of inventory in a production environment and orders a fixed amount of inventory each time stock levels drop below a specified value. In FIG. 3, the order-up-to level, 'S' 300, represents the maximum level of inventory and the reorder point, 's' 305, represents an inventory threshold value. When the inventory position falls below 's', an order represented by the amount 'S'−'s' may be placed. For example, 'S' may equal 20,000 pages and 's' may equal 5,000 pages. If the inventory level reaches 4,999 pages, 15,000 pages (i.e., 'S'−'s') may be ordered.

Order-up-to and average inventory levels may be determined using one or more parameter values such as lead time ("L"), average daily demand ("AVG"), standard deviation of daily demand ("STD"), inventory holding cost per unit produced per day ("h"), the fixed cost associated with each inventory order ("K") and the like. Lead time may refer to the inventory replenishment time from a supplier in days. A safety factor ("z") may also be used. The safety factor may be chosen from one or more statistical tables so that the probability of stock-outs during the lead time period is $1-\alpha$.

Assuming that the demand follows a normal distribution, Table 1 may illustrate the relationship between z and $\alpha$ according to an embodiment.

TABLE 1

Relationship between $\alpha$ and z

| | | $\alpha$ | | | | | | | | | |
|---|---|---|---|---|---|---|---|---|---|---|---|
| | 90% | 91% | 92% | 93% | 94% | 95% | 96% | 97% | 98% | 99% | 99.9% |
| z | 1.29 | 1.34 | 1.41 | 1.48 | 1.56 | 1.65 | 1.75 | 1.88 | 2.05 | 2.33 | 3.08 |

As such, 's' may satisfy the following:

Probability {demand during lead time $\geq$ s}=$1-\alpha$.

For example, an $\alpha$ of 0.999 implies that stock-outs do not occur more than 0.001% of the time. In other words, the cumulative demand during the lead time may be less than 's' for 99% of the time to prevent stock-outs. If the demand follows a normal distribution, a lookup table may used to determine a safety factor value of z=3.08 that corresponds to $\alpha$=0.999.

Based on these parameters, the order-up-to level, 'S', may be determined by:

$$S = \sqrt{\frac{2K*AVG}{h}} + z*STD*\sqrt{L}.$$

Similarly, the average inventory level may be determined by:

$$AverageInventoryLevel = \sqrt{\frac{K*AVG}{2h}} + z*STD*\sqrt{L}.$$

In another embodiment, a variable continuous review order policy may be used to determine order-up-to and average inventory levels. In such an embodiment, the lead time may be variable rather than being fixed. For example, inventory may be replenished after a first stock-out in two days, after a second stock-out in two and a half days, after a third stock-out in one day, and so on. As such, additional parameters associated with this order policy may include average lead time ("AVGL") and standard deviation of lead time ("STDL").

An average level may be determined by:

$$s = AVG*AVGL + z*\sqrt{AVGL*STD^2 + AVG^2*STDL^2}$$

An order-up-to inventory level may be determined by:

$$S = \sqrt{\frac{2K*AVG}{h}} + AVG*AVGL + z*\sqrt{AVGL*STD^2 + AVG^2*STDL^2}$$

In another embodiment, a base stock order policy may be used to determine maximum average inventory levels. A base stock order policy may periodically review and replenish inventory to a base stock level. The inventory may be reviewed at periodic intervals, such as every five days, and compared with a specified base stock level. The difference between the base stock level of inventory and the current inventory may then be ordered. As such, additional parameters associated with this order policy may include the length of the review period ("t").

Figure 4:
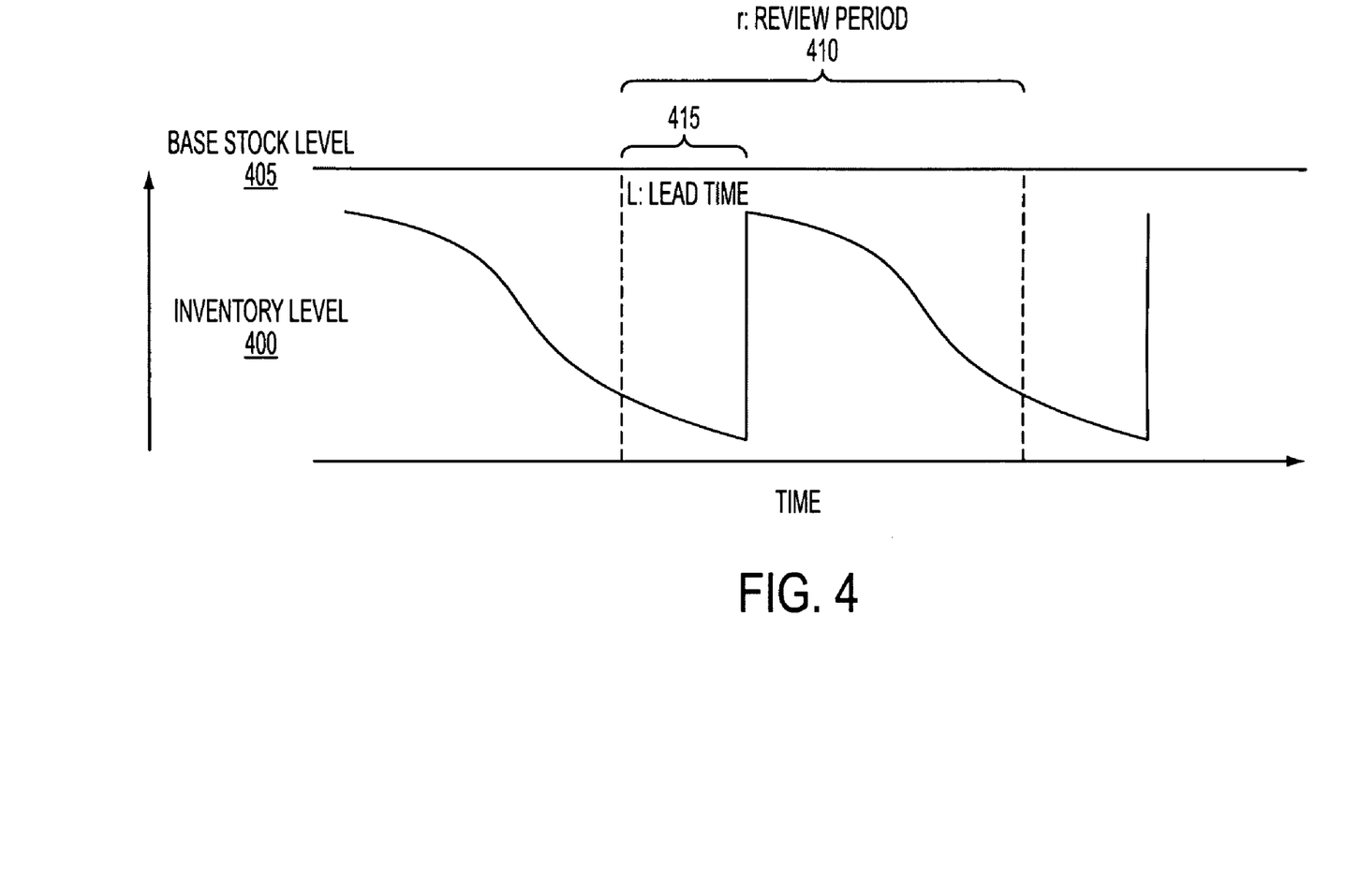
FIG. 4 depicts a graphical representation of an exemplary base stock level inventory policy according to an embodiment.

FIG. 4 illustrates a graphical representation of the base stock level policy. If the inventory level 400 falls below a base stock level 405 during the review period 410, an order may be placed and the inventory may be replenished after the lead time 415.

In an embodiment, an order-up-to level, 'S', determined using a base stock policy may be represented by:

$$S = r*AVG + z*STD*\sqrt{r+L}.$$

In an embodiment, an average inventory level determined using a base stock level policy may be represented by:

$$AverageInventoryLevel = \frac{r*AVG}{2} + z*STD*\sqrt{r+L}.$$

Referring back to FIG. 2, job demand information may be received 210 for each identified type. Job demand information is the job volume associated with a form type over a certain period. For example, job demand information may be the number of pages of the form type processed by the pre-processing environment per day. Table 2 illustrates the volume per day for five form types over a seven day period.

TABLE 2

| Form Type | Day 1 | Day 2 | Day 3 | Day 4 | Day 5 | Day 6 | Day 7 |
|---|---|---|---|---|---|---|---|
| A | 134,592 | 100,623 | 92,454 | 103,294 | 110,234 | 95,176 | 98,632 |
| B | 1,895 | 1,542 | 1,003 | 2,534 | 2,045 | 1,945 | 987 |
| C | 53,328 | 49,012 | 34,785 | 61,073 | 59,672 | 54,876 | 43,092 |
| D | 70 | 0 | 65 | 34 | 81 | 62 | 29 |
| E | 598 | 723 | 410 | 327 | 568 | 932 | 238 |

In an embodiment, job demand information may be automatically received 210 from the pre-processing environment. In such an embodiment, the system may query one or more resources located in the pre-processing environment. A resource is a device that performs a processing function for a print job. For example, a resource may include a printer, a copier, a binder, a hole-punch, a collator, a sealer or any other equipment used to process print jobs. Job demand information may be received by the system from one or more resources in the pre-processing environment. The job demand information may be used to determine inventory information associated with an identified form types. In an embodiment, job demand information may be received 210 from a user. The job demand information may include job demand values such as a print volume per day or the like.

In an embodiment, form type inventory information may be determined 215 for each identified form type using an inventory policy and the job demand information associated with the form type. Form type inventory information is data related to inventory levels associated with a form type. Form type inventory information may include an average inventory level, an order-up-to level, a coefficient of variation or the like. A coefficient of variation represents demand variation and may be determined by dividing the standard deviation of volume by the mean in volume for a certain form type.

Referring back to Table 2, form type inventory information may be determined 215 for Form Types A, B, C, U and E. For example, with respect to Form Type A, a user may select a fixed continuous review policy, and the parameters associated with this inventory policy may have the following values:

L=1 day
AVG=105,000.71
STD=14,257.25
h=$0.000001
K=$50.00
z=3

The order-up-to level associated with Form Type A may be determined by:

$$S = \sqrt{\frac{2K*AVG}{h}} + z*STD*\sqrt{L} = 3,283,153.$$

The average inventory level associated with Form Type A may be determined by $$AverageInventoryLevel = \sqrt{\frac{K*AVG}{2h}} + z*STD*\sqrt{L} = 1,662,962.$$

In other words, the pre-processing environment may maintain an order-up-to level of inventory (in this case paper) of 3,283,153 pages of Form Type A and an average inventory level of 1,662,962 pages of Form Type A.

Table 3 illustrates order-up-to levels and average inventory levels for the form types in Table 2 determined using a fixed continuous review policy.

TABLE 3

| Form Type | Order-Up-To Level-'S' | Average Inventory Level |
|---|---|---|
| A | 3,283,153 | 1,662,962 |
| B | 414,895 | 208,298.7 |
| C | 2,282,738 | 1,155,418 |
| D | 69,881 | 34,983.68 |
| E | 233,589 | 117,154 |
| Total | 6,284,256 | 3,178,816.38 |

Total inventory requirements may be determined 220 for the identified form types. Total inventory requirements are inventory levels that a pre-processing environment must maintain in order to process the aggregate job demand for the identified form types. Total inventory requirements may include a total order-up-to level, a total average inventory level or the like.

In an embodiment, the total inventory requirements may be determined 220 by summing the inventory information associated with the identified form types. For example, as illustrated by Table 3, the total order-up-to level for the form types may be determined by summing the order-up-to levels for Form Types A, B, C, D, E. Similarly, the total average inventory level for the print shops may be determined by summing the average inventory levels for Form Types A, B, C, D and E.

Migrated job demand information may be determined 225 for a dynamic processing environment. Migrated job demand information is the aggregate job volume over a time period that is associated with the form types identified for migration. Migrated job demand information may be determined by summing the job demand information of the form types to be migrated. Table 4 illustrates the migrated job demand information associated with migrating Form Types A, B, C, D and E. For example, the migrated job demand information associated with Day 1 (i.e., 190,483) may be the sum of the job demand information associated with Form Types A, B, C, D, and E on Day 1 (i.e., 134,592+1,895+53,328+70+598).

TABLE 4

| | Day | | | | | | |
|---|---|---|---|---|---|---|---|
| | Day 1 | Day 2 | Day 3 | Day 4 | Day 5 | Day 6 | Day 7 |
| Migrated job demand information | 190,483 | 151,900 | 128,717 | 167,262 | 172,600 | 152,991 | 142,978 |

Migrated inventory requirements may be determined 230 using inventory information corresponding to the identified form types to migrate. Migrated inventory requirements are inventory levels that a dynamic processing environment must maintain in order to process its job demand. Migrated inventory requirements may include a migrated average inventory level, a migrated order-up-to level, a coefficient of variation or the like, and may be determined 230 using an inventory policy such as those previously discussed. For example, using a fixed continuous review policy and the migrated job demand information from Table 4, the associated parameters may have the following values:

L=1 day
AVG=158,133
STD=18,896.03
h=$0.000001
K=$50.00
z=3

The order-up-to level associated with the dynamic processing environment may be determined by:

$$S = \sqrt{\frac{2K*AVG}{h}} + z*STD*\sqrt{L} = 4,037,824.$$

The average inventory level associated with dynamic processing environment may be determined by:

$$AverageInventoryLevel = \sqrt{\frac{K*AVG}{2h}} + z*STD*\sqrt{L} = 2,049,527.$$

In other words, the dynamic processing environment may maintain an order-up-to level of inventory (in this case, paper) of 4,037,824 pages and an average inventory level of 2,049,527 pages in order to process the volume of jobs listed in Table 4. As such, the order-up-to level for the dynamic processing environment is approximately 36% less than that of the pre-processing environment. In addition, the average inventory level for the dynamic processing environment is approximately 36% less than the pre-processing environment.

One or more statistics pertaining to one or more of the job demand information, the total inventory requirements and the migrated inventory requirements may be displayed 235 to a user. A statistic is a summary of information that may be used in evaluating the impact of migrating from a pre-processing environment to a dynamic processing environment.

Figure 5:
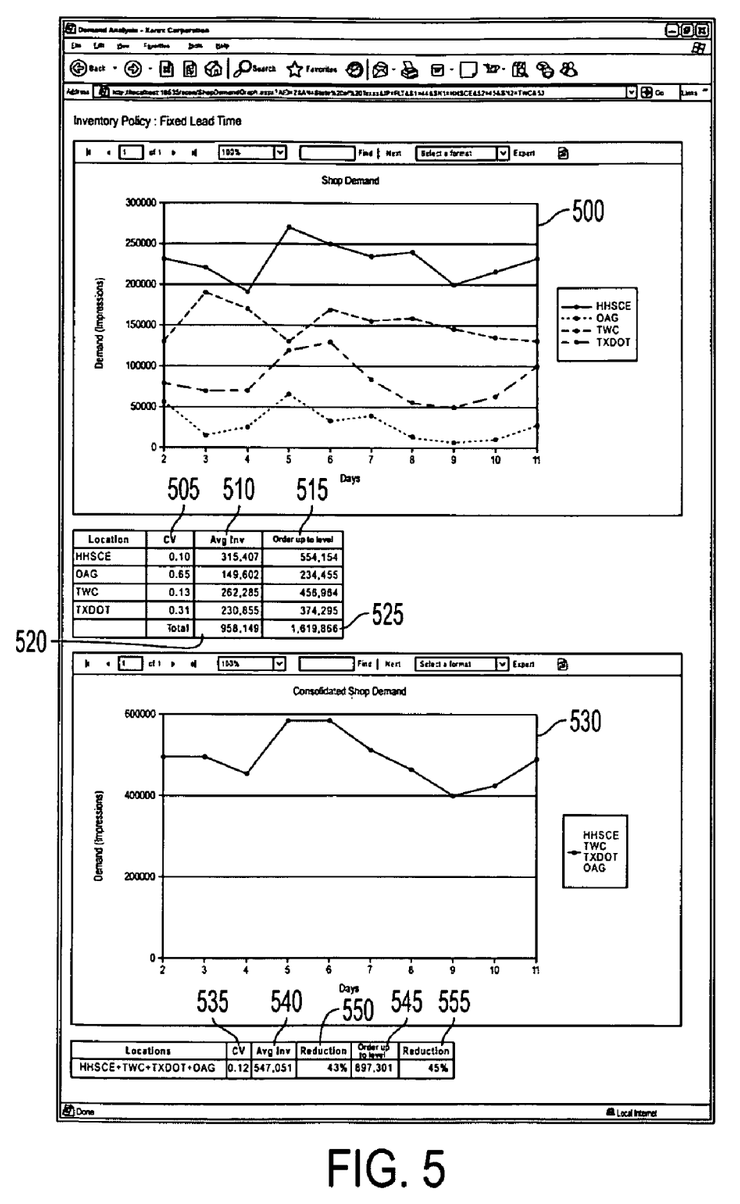
FIG. 5 depicts exemplary information associated with a plurality of form types and exemplary information associated with a dynamic processing environment according to an embodiment.

In an embodiment, the analysis may include a comparison of the inventory levels of the pre-processing environment to the inventory levels associated with the dynamic processing environment In an embodiment, the analysis may include one or more of a graph of the job demand information for one or more identified form types a graph of the migrated job demand information, the average inventory level for one or more identified form types, the order-up-to level for one or more identified form types, the total average inventory level, the total order-up-to level, the migrated average inventory level, the migrated order-up-to level or the like may be displayed. For example, FIG. 5 depicts an exemplary graph 500 illustrating the job demand information for each identified form type and an exemplary chart listing the coefficients of variation 505, the average inventory levels 510 and the order-up-to levels 515 associated with each identified form type. The chart also lists the total average inventory level 520 and the total order-up-to level 525 for the identified form types.

FIG. 5 also depicts an exemplary graph illustrating job demand information 530 for a dynamic processing environment and an exemplary chart listing the coefficient of variation 535, the average inventory level 540, the order-up-to level 545 and inventory reduction percentages 550, 555. An inventory reduction percentage is the percentage by which an inventory level associated with the pre-processing environment is reduced by migrating to a dynamic processing environment. An inventory reduction percentage may be determined for an order-up-to level, an average inventory level or the like. In an embodiment, the reduction in average inventory level may be determined by dividing the difference between the total average inventory level and migrated average inventory level by the total average inventory level. Similarly, the reduction in order-up-to level may be determined by dividing the difference between the total order-up-to level and the migrated maximum inventory level by the total order-up-to level.

Figure 6:
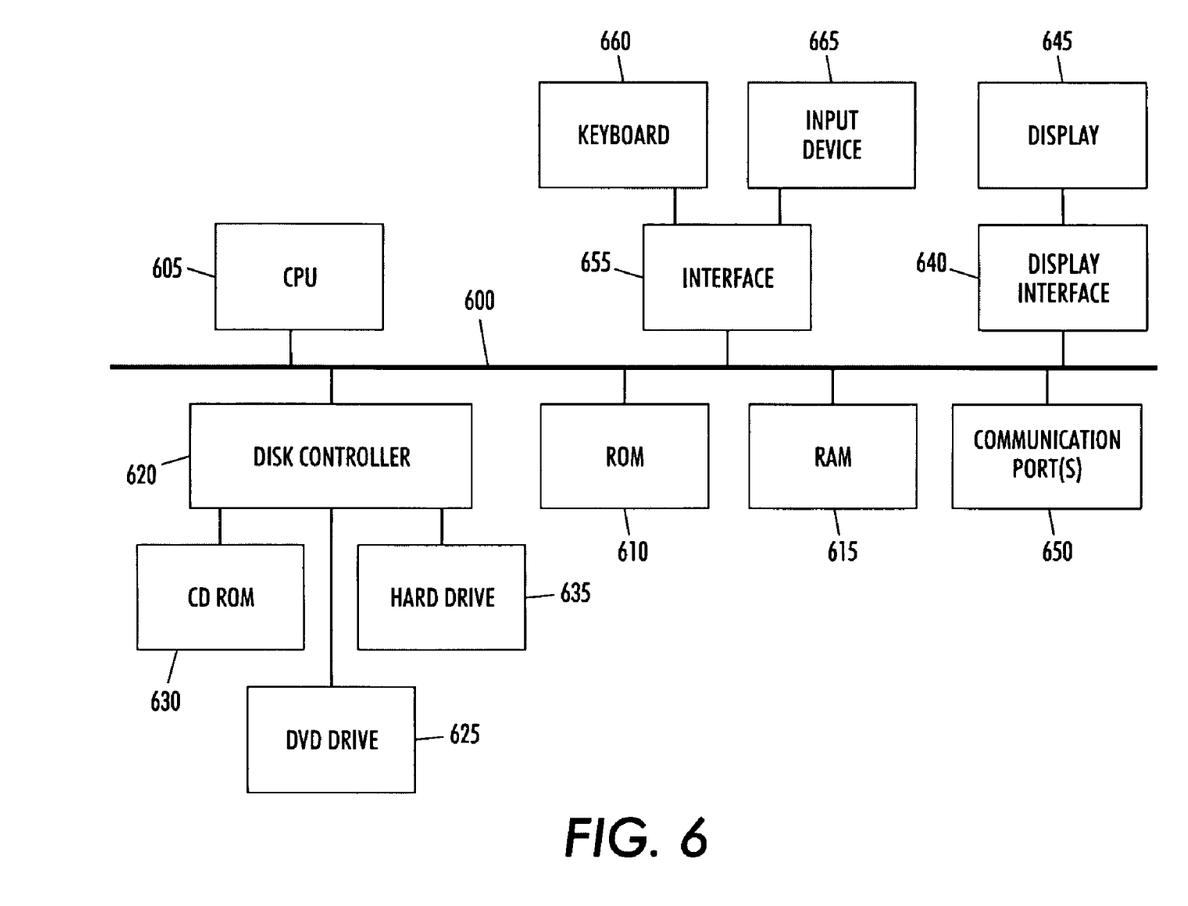
FIG. 6 depicts a block diagram of exemplary internal hardware that may be used to contain or implement the program instructions according to an embodiment.

FIG. 6 depicts a block diagram of exemplary internal hardware that may be used to contain or implement the program instructions according to an embodiment. A bus 600 serves as the main information highway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A disk controller 620 interfaces with one or more optional disk drives to the system bus 600. These disk drives may include, for example, external or internal DVD drives 625, CD ROM drives 630 or hard drives 635. As indicated previously, these various disk drives and disk controllers are optional devices.

Program instructions may be stored in the ROM 610 and/or the RAM 615. Optionally, program instructions may be stored on a computer readable medium such as a compact disk, a digital disk or other recording medium.

An optional display interface 640 may permit information from the bus 600 to be displayed on the display 645 in audio, graphic or alphanumeric format. Communication with external devices may occur using various communication ports 650. An exemplary communication port 650 may be attached to a communications network, such as the Internet or an intranet.

In addition to the standard computer-type components, the hardware may also include an interface 655 which allows for receipt of data from input devices such as a keyboard 660 or other input device 665 such as a mouse, remote control, pointer and/or joystick.

An embedded system, such as a sub-system within a xerographic apparatus, may optionally be used to perform one, some or all of the operations described herein. Likewise, a multiprocessor system may optionally be used to perform one, some or all of the operations described herein.

In an embodiment, one or more statistics may be displayed via a graphical interface, such as display interface 640.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of evaluating an impact on inventory levels of migrating from a pre-processing environment to a dynamic processing environment, the method comprising:
   identifying a plurality of form types to migrate from a pre-processing environment to a dynamic processing environment such that all received print jobs that use the plurality of forms in the pre-processing environment are performed in the dynamic processing environment, thereby eliminating use of the plurality of forms, wherein the pre-processing environment is a production environment where one or more operations are performed on a printing substrate to create the plurality of forms before receiving a print job to be processed on one of the plurality of forms, and the dynamic processing environment is a production environment where the one or more operations are performed on the printing substrate after receiving the print job, thereby replicating the information contained in at least one of the plurality of forms without first creating the plurality of forms prior to receiving the print job;
   identifying an inventory policy including an impact on inventory levels for migrating from the pre-processing environment to the dynamic processing environment, wherein the inventory policy comprises at least one user selected parameter associated with each of the plurality of forms used to determine costs associated with required inventory levels for each of the plurality of forms;
   for each identified form type, receiving corresponding job demand information;
   determining, by a computing device, a plurality of total inventory requirements and associated costs for the identified form types based on the identified inventory policy, wherein the total inventory requirements comprise a total average inventory level and a total order-up-to level;
   determining, by the computing device, a plurality of migrated inventory requirements for the dynamic processing environment based on the identified inventory policy, wherein the migrated inventory requirements comprise a migrated average inventory level and a migrated order-up-to level determined such that the dynamic processing environment handles all incoming job demands; and
   displaying, to a user, one or more statistics pertaining to one or more of the job demand information, the total inventory requirements and the migrated inventory requirements.

2. The method of claim 1, wherein identifying a plurality of form types comprises:
   receiving, from a user, a selection of the plurality of form types to migrate.

3. The method of claim 1, wherein identifying an inventory policy comprises:
   receiving, from a user, a selection of one of a fixed lead time policy, a variable lead time policy and a base stock policy.

4. The method of claim 1, wherein receiving corresponding job demand information comprises:
   receiving, from a user, one or more job demand values, wherein each job demand value comprises a print volume associated with a day.

5. The method of claim 1, wherein receiving corresponding job demand information comprises:
   querying one or more resources in the pre-processing environment; and
   receiving, from the one or more resources, one or more job demand values, wherein each job demand value comprises a print volume associated with a day.

6. The method of claim 1, wherein determining a plurality of total inventory requirements comprises:
   for each identified form type, using the corresponding job demand information and the identified inventory policy to determine an average inventory level and an order-up-to level;
   determining the total average inventory level by summing the average inventory levels associated with each identified form type; and
   determining the total order-up-to level by summing the order-up-to levels associated with each identified form type.

7. The method of claim 6, wherein the average inventory level and an order-up-to level are based on one or more of the following parameters associated with the form type:
   a lead time;
   an average daily demand,
   a standard deviation of daily demand;
   an inventory holding cost;
   a fixed cost; and
   a safety factor.

8. The method of claim 1, wherein determining one or more migrated inventory requirements comprises:
   determining migrated job demand information by summing the job demand information for each identified form type; and
   using the identified inventory policy and the migrated consolidated job demand information to determine the migrated average inventory level and the migrated order-up-to level.

9. The method of claim 1, wherein displaying one or more statistics comprises displaying one or more of the following:
   a graph of the job demand information for one or more identified form types;

a graph of the migrated job demand information;
an average inventory level for one or more of the identified form types;
an order-up-to level for one or more of the identified form types;
the total average inventory level;
the total order-up-to level;
the migrated average inventory level;
the migrated order-up-to level; and
an inventory reduction percentage representing a change in an inventory level due to migrating from a pre-processing environment to a dynamic processing environment.

10. A system of evaluating an impact on inventory levels of migrating from a pre-processing environment to a dynamic processing environment comprising:
a processor; and
a processor-readable storage medium in communication with the processor,
wherein the processor-readable storage medium contains one or more programming instructions for:
identifying a plurality of form types to migrate from a pre-processing environment to a dynamic processing environment such that all received print jobs that use the plurality of forms in the pre-processing environment are performed in the dynamic processing environment, thereby eliminating use of the plurality of forms, wherein the pre-processing environment is a production environment where one or more operations are performed on a printing substrate to create the plurality of forms before receiving a print job to be processed on one of the plurality of forms, and the dynamic processing environment is a production environment where the one or more operations are performed on the printing substrate after receiving the print job, thereby replicating the information contained in at least one of the plurality of forms without first creating the plurality of forms prior to receiving the print job,
identifying an inventory policy including an impact on inventory levels for migrating from the pre-processing environment to the dynamic processing environment, wherein the inventory policy comprises at least one user selected parameter associated with each of the plurality of forms used to determine costs associated with required inventory levels for each of the plurality of forms,
for each identified form type, receiving corresponding job demand information,
determining, by a computing device, a plurality of total inventory requirements and associated costs for the identified form types based on the identified inventory policy, wherein the total inventory requirements comprise a total average inventory level and a total order-up-to level,
determining, by the computing device, a plurality of migrated inventory requirements for the dynamic processing environment, wherein the migrated inventory requirements comprise a migrated average inventory level and a migrated order-up-to level determined such that the dynamic processing environment handles all incoming job demands, and
displaying one or more statistics pertaining to one or more of the job demand information, the total inventory requirements and the migrated inventory requirements.

11. The system of claim 10, wherein the one or more programming instructions for identifying a plurality of form types comprise one or more programming instructions for selecting the plurality of form types to migrate.

12. The system of claim 10, wherein the one or more programming instructions for identifying an inventory policy comprise one or more programming instructions for selecting one of a fixed lead time policy, a variable lead time policy and a base stock policy.

13. The system of claim 10, wherein the one or more programming instructions for receiving corresponding job demand information comprise one or more programming instructions for receiving one or more job demand values, wherein each job demand value comprises a print volume associated with a day.

14. The system of claim 10, wherein the one or more programming instructions for receiving corresponding job demand information comprise one or more programming instructions for:
querying one or more resources in the pre-processing environment; and
receiving, from the one or more resources, one or more job demand values, wherein each job demand value comprises a print volume associated with a day.

15. The system of claim 10, wherein the one or more programming instructions for determining a plurality of total inventory requirements comprise one or more programming instructions for:
for each identified form type, using the corresponding job demand information to determine an average inventory level and an order-up-to level;
determining the total average inventory level by summing the average inventory levels associated with each identified form type; and
determining the total order-up-to level by summing the order-up-to levels associated with each identified form type.

16. The system of claim 10, wherein the one or more programming instructions for determining one or more migrated inventory requirements comprise one or more programming instructions for:
determining migrated job demand information by summing the job demand information for each identified form type; and
using the identified inventory policy and the migrated consolidated job demand information to determine the migrated average inventory level and the migrated order-up-to level.

17. The system of claim 10, wherein the one or more programming instructions for displaying one or more statistics comprise one or more programming instructions for displaying one or more of the following:
a graph of the job demand information for one or more identified form types;
a graph of the migrated job demand information;
an average inventory level for one or more of the identified form types;
an order-up-to level for one or more of the identified form types;
the total average inventory level;
the total order-up-to level;
the migrated average inventory level;
the migrated order-up-to level; and
an inventory reduction percentage representing a change in an inventory level due to migrating from a pre-processing environment to a dynamic processing environment.

* * * * *